(12) United States Patent
Zettle (10) Patent No.: US 7,249,410 B2
(45) Date of Patent: Jul. 31, 2007

(54) ELECTRIC CABLE SPLICING SYSTEM

(76) Inventor: Elmer Edward Zettle, 742 95th Ave. N., Naples, FL (US) 34108

(*) Notice: Subject to any disclaimer, the term of this patent is extended or adjusted under 35 U.S.C. 154(b) by 436 days.

(21) Appl. No.: 10/900,417

(22) Filed: Jul. 28, 2004

(65) Prior Publication Data

US 2006/0022183 A1    Feb. 2, 2006

(51) Int. Cl.
  *B23P 19/00* (2006.01)
  *H01R 43/00* (2006.01)
(52) U.S. Cl. .............. 29/755; 29/745; 29/758; 29/760; 269/2; 269/903
(58) Field of Classification Search ......... 29/755–758, 29/760, 828, 868, 745, 747–748, 281.6; 269/45, 269/903, 6, 13; 72/409–410; 439/798, 523; 174/22 R, 71 R See application file for complete search history.

(56) References Cited

U.S. PATENT DOCUMENTS

| 3,754,845 A | * | 8/1973 | Rauscher et al. ........... 425/111 |
| 3,791,008 A | * | 2/1974 | Dyksterhouse .............. 29/56.6 |
| 4,308,661 A | * | 1/1982 | Hallstrom, Jr. ............. 29/764 |
| 4,416,506 A | * | 11/1983 | Johnson et al. ............. 385/137 |
| 5,718,037 A | * | 2/1998 | Gale ........................... 29/755 |
| 2003/0019000 P1 | * | 1/2003 | Bregeon |
| 2006/0022183 A1 | * | 2/2006 | Zettle ........................ 254/334 |

* cited by examiner

*Primary Examiner*—Minh Trinh (57) ABSTRACT

A system for splicing together heavy duty electric cables, especially underground cables, consisting of a static friction block and a clamping friction block located on ends of cables to be spliced. A block and tackle mechanism is interposed between the friction block and the clamping block to provide a force to move various elements on the cables to various and final predetermined locations to make up the splice. The block and tackle mechanism has a wind-up spool thereon to wind-up ends of cords of the block and tackle mechanism. The wind-up spool provides the necessary force to accomplish the move of the various elements.

19 Claims, 13 Drawing Sheets

ELECTRIC CABLE SPLICING SYSTEM

BACKGROUND OF THE INVENTION

This invention involves the splicing together of high power electrical wires or cables, especially underground cables. There is no known device that can be used in splicing together the above noted cables, other than hand tools, because they are large in diameter and the outer layer is made of a plastic or rubber material that must be and remain water resistant for obvious reasons. Most all of the connections made are made by hand, especially when applying a connection sleeve over the wire splice once they have been made. The connection sleeve or housing has to have an extreme tight fit to be water proof. The only way to slide the connection sleeve or housing over the splice is by hand because any tools used can damage the outer circumference which is highly undesirable and may distort the cable or the housing out of round whereby the integrity of the water tight fit is violated. It takes extreme strong hands to accomplish the task of connection and it is very time consuming and labor intensive.

BRIEF DESCRIPTION OF THE INVENTION

The inventive device involves a power element such as a block and tackle. The cable to be connected to another cable receives a clamping block having interior friction mediums therein. The clamping block completely surrounds the outer circumference of the cable without distorting the same. The friction medium used inside the clamping block does not damage the outer material of the cable but is designed so as not to move relative to the cable when a pulling force is applied to the clamping block. The pulling force is derived from a block and tackle element. One end of the block and tackle element is located in a stationary manner while the other end of the block and tackle is movable, such as when attached to the clamping block. The cord of the block and tackle element is attached to a wind-up device. When the cord is wound up the force generated thereby exerts a moving force on the clamping block to effortless move the same in its designated path which will be explained below.

DETAILED DESCRIPTION OF THE INVENTION

Figure 1:
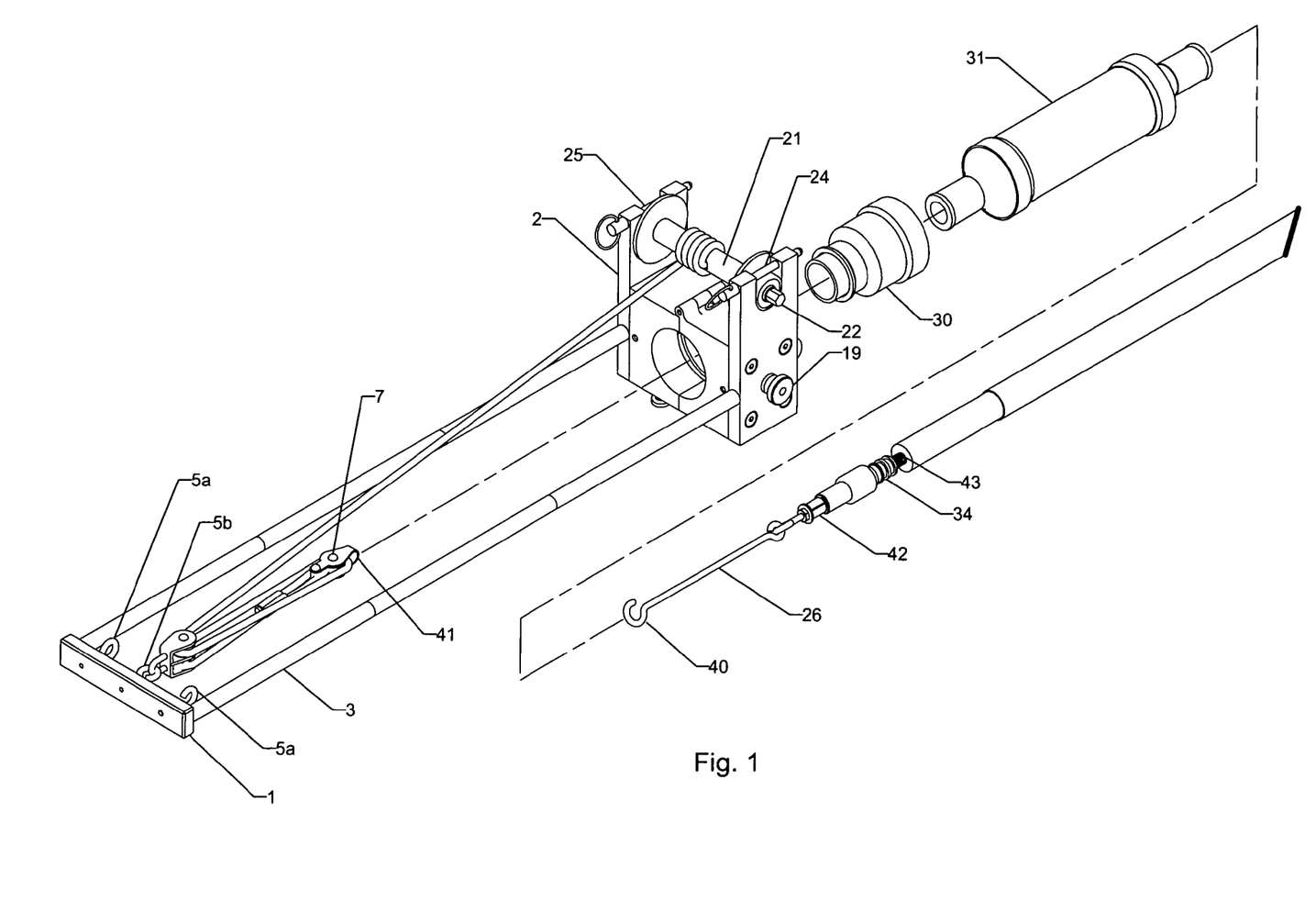
FIG. 1 illustrates a first stage of making a splice.
Figures 1A, 1B, 1D:
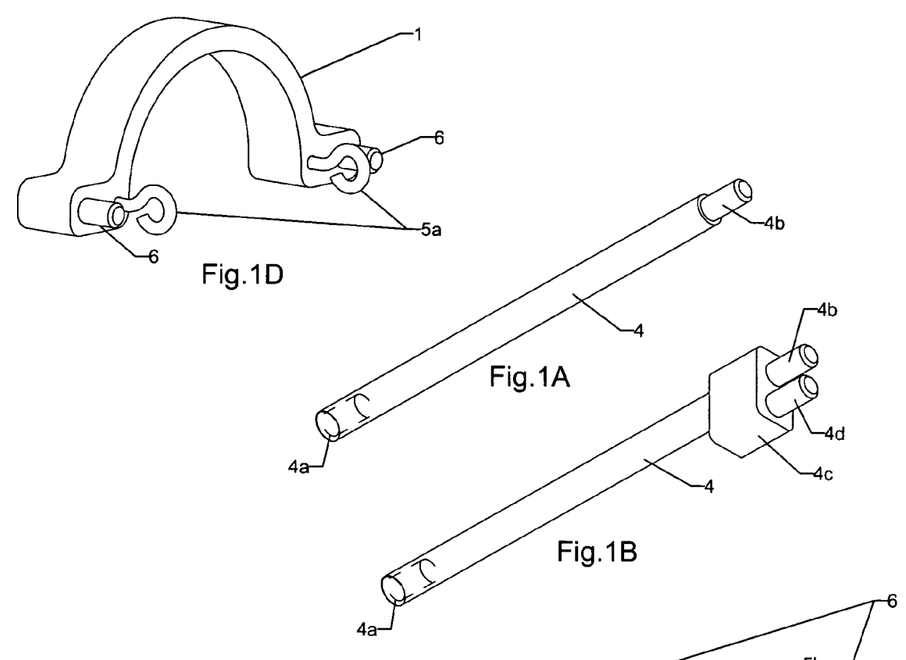
FIGS. 1A-1D show different elements used in making electrical splices
Figure 1C:
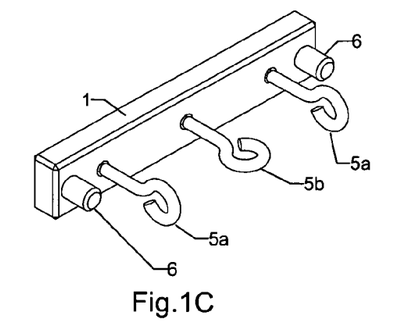
Figures 4A, 4B, 4C, 4D, 4E:
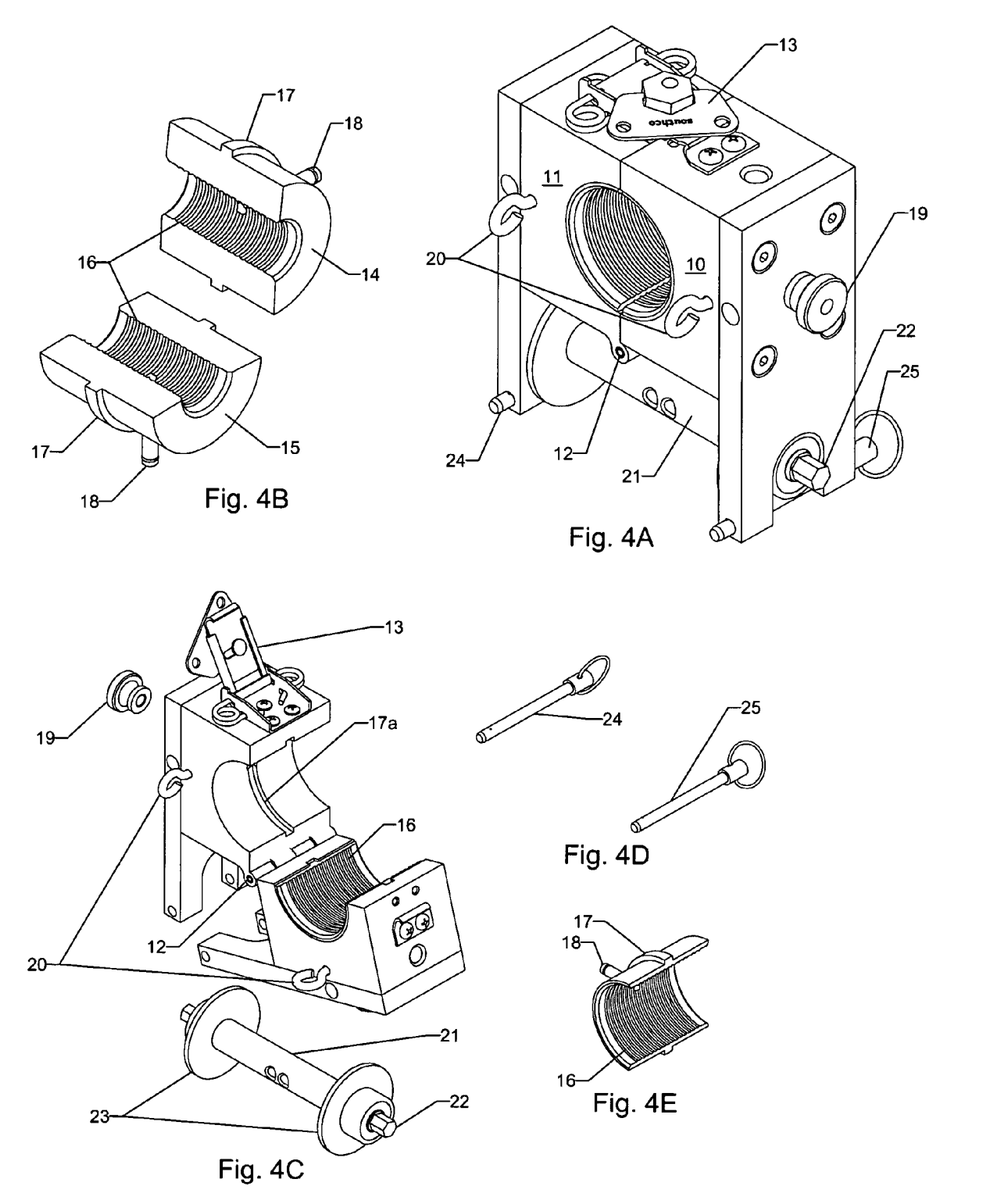
FIG. 4A shows a detailed illustration of a clamping block.
FIG. 4B shows clamping elements used in a clamping block.
FIG. 4C shows the clamping block of FIG. 4A in an open position.
FIG. 4D illustrates retaining pins for a spool shown in FIG. 4A.
FIG. 4E shows a spool for a wind-up of a block and tackle.

FIG. 1 illustrates a first stage of the process when splicing an electrical underground cable. The reason there are several stages is the fact that various pulling forces on the elements of the splice occur in different or opposite directions. In this first stage there is a stationary block 1 and there is a stationary clamping block 2. The reason why these blocks are stationary is that various elements that make up the splice have to move independently of the cable that is clamped or will be by the clamping block 2. Both the clamping block and the stationary block are held in their position by the static rods 3. The stationary block 1 is shown in more detail below in FIG. 1C. The static rods 3 are shown in more detail in FIGS. 1A and 1B below. The stationary block 1 consists of pegs 6 which can and will receive at least one end of the static bar 3 in FIG. 1. The pegs 6 can be threaded or be smooth depending on the manufacturer. The clamping block 2 is made up of two halves 10 and 11 (FIG. 4A) which are connected by a hinge 12 (FIGS. 4A and 4C). The clamping block 2 carries at an upper end thereof a wind-up spool 21 which will wind-up cords of a block and tackle system 7 (which will be explained in more detail below. The wind-up spool is held in place in its cradle by retaining pins 24 and 25. Prior to making a connection between a cable and the block and tackle, the system has to be threaded by way of a threading tool 16 which passes through a splice housing 31, a temporary adapter 30 and through the center of the clamping block 2 and then on to a connection 41 on the block and tackle 7. The spool 21 has a wind-up stem 22 which can be connected to a socket of a ratchet tool or an electric appliance (not shown). One end 40 of the threading tool 26 is connected to the receiving eyelet 41 of the block and tackle element 7. The threading tool 26 includes an expanding screw connector which will be received within the compression connection 42. The connector also includes the crimped ends 34 of the bare cable 43.

Figure 2:
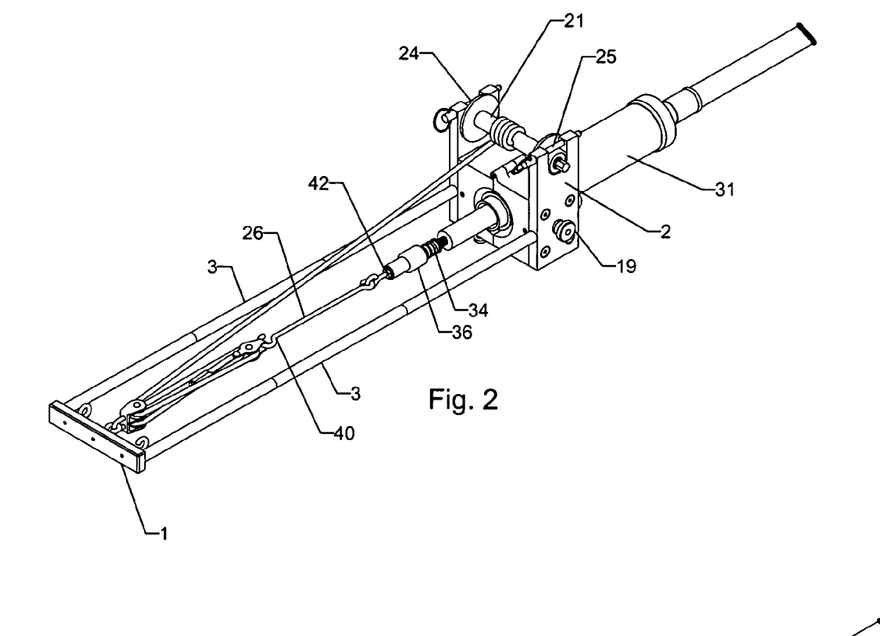
FIG. 2 is a representation of a second stage of making an electrical splice.

FIG. 2 illustrates the second stage of making an electrical splice in an underground cable. In this illustration it can be seen that the block an tackle 7 (FIG. 1) has pulled the cable including the splice housing 31 into the clamping block 2 including the temporary adapter 30 (FIG. 1) into a proper concentric position. At this point the crimped end 34 of the incoming cable including a compression connection is ready for receiving a housing 31.

Figure 3:
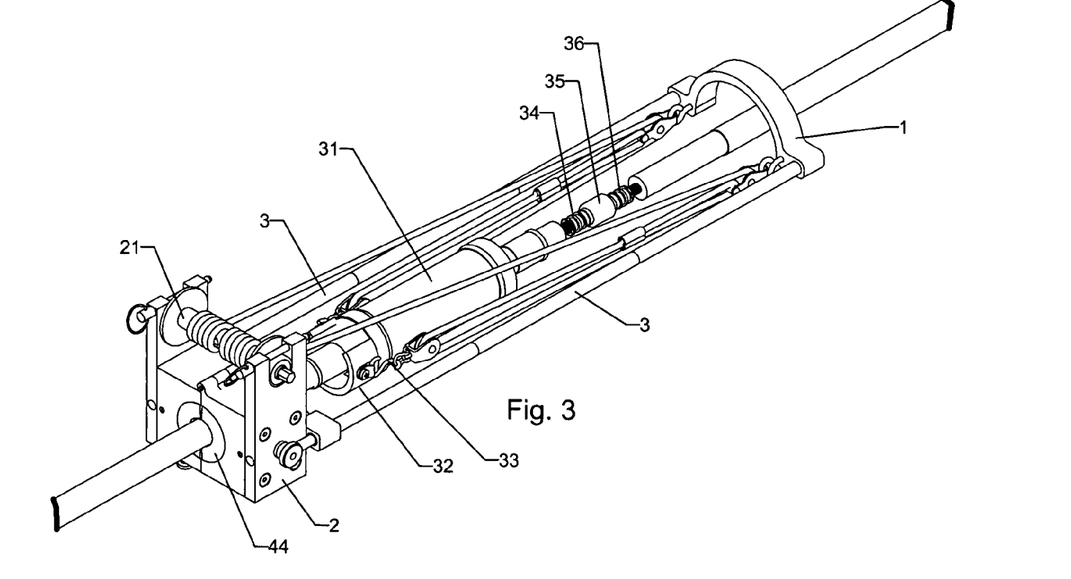
FIG. 3 is a final stage of making an electrical splice.

FIG. 3 illustrates the reverse movement of the block and tackle. In this third stage of making a splice, the clamping block 2 is stationarily supported on an outgoing cable assembly. There is a gripping adapter 44 which frictionally grips the cable at that point. There is a counter stationary block 1 (also shown in FIG. 5A) which acts as a counter force to the clamping block 2 because of the presence of the static bars 3. The object of this third splicing stage is to apply the splice housing 31 over the previously crimped ends 34 and 35 which are covered by a compression connection. To this end, the housing 31 is pulled over the splices 34 and 35 by way of a pulling collar 32 (also shown in FIG. 13A). The pulling collar 32 abuts against a ridge (not shown) on the housing 31. In this pulling stage, there is a dual block and tackle wherein the ends of the cords are threaded into the spool 21. The other ends of the cords are attached to attachment hooks 33 on the pulling collar 32. The return ends of the block and tackle are attached at 5a and 5b on the stationary block 1. Also see FIG. 5A.

FIG. 4A is a detailed illustration of the clamping block 2 shown in FIG. 1 The basic clamping block has been identified as 2 (FIG. 1). The clamping block 2 consists of two halves 10 and 11 which are hinged together by a hinge 12. The two halves 10 and 11 are clamped together by way of a compression clamp 13. There are two eyelet hooks 20 which receive the ends of a cord coming from the block and tackle elements. The clamping block 2 also has a winding spool 21 mounted therein for the purpose of winding the ends of the cords coming from the block and tackle elements. The ends of the rewinding spool 21 are held in place by retaining pins 24 and 25. The end 22 of the spool is designed to receive a pair of pliers, a wrench or a socket of a ratchet handle in order to wind the same. Turning now to FIG. 4B, there is shown to halves 14 and 15 of friction elements that are installed within each halve of the clamping block. Each of the halves 14 and 15 have a holding pin 18 attached thereto to penetrate each of the halves 14 and 15 and to be securely held in place by outside lock nuts 19. The inside of each of the halves has ribs 16 made therein to act as gripping surfaces so that the clamping block can grip the outer surface of a cable to be pulled. Other friction surfaces could be used such as layers of sandpaper. FIG. 4A also shows eyelets 20 which are used to anchor each end of the block and tackle cords therein. The clamping segments 14 and 15 each have a central and outer centering ridge thereon to be received in a groove 17a in each of the clamping halves 10 and 11.

FIG. 4C shows the clamping block 2 of FIG. 4A in an open position. The same reference characters are being used as were shown in 4A. No further explanation of this FIG. seems to be necessary. FIG. 4C also illustrates the wind-up spool 21 which has flanges 23 thereon and at one end thereof shows an attachment for a tool such as a socket of a ratchet handle.

FIG. 4D illustrates the retaining pins 24 and 25.

FIG. 4E illustrates a friction insert 16 that is to inserted into the clamping halves 14 and 15 which are located in the clamping block 2 (FIGS. 1, 2 and 4A). The ridge 17 is clearly shown which will be received in the groove 17a (FIG. 4C) to stabilize the same. The retaining pin 18 can also be seen which is held in place by the lock nut 19 in FIG. 4A. As explained above, the friction insert 16 has friction ribs therein to securely grip the outer circumference of a cable being operated on.

Figure 4F:
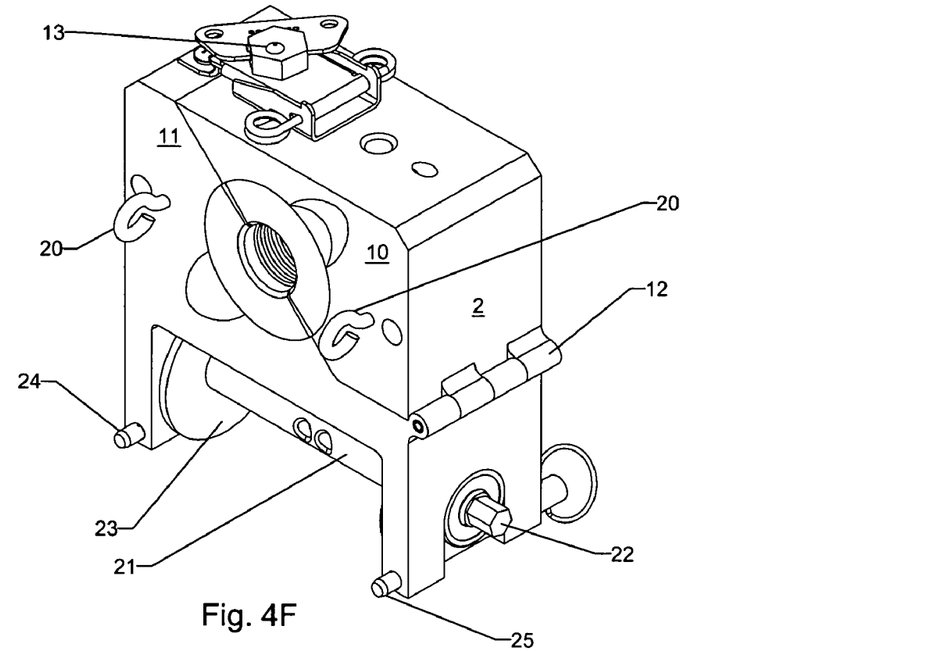
FIG. 4F illustrates a clamping block being hinged in a diagonal manner.
Figure 4G:
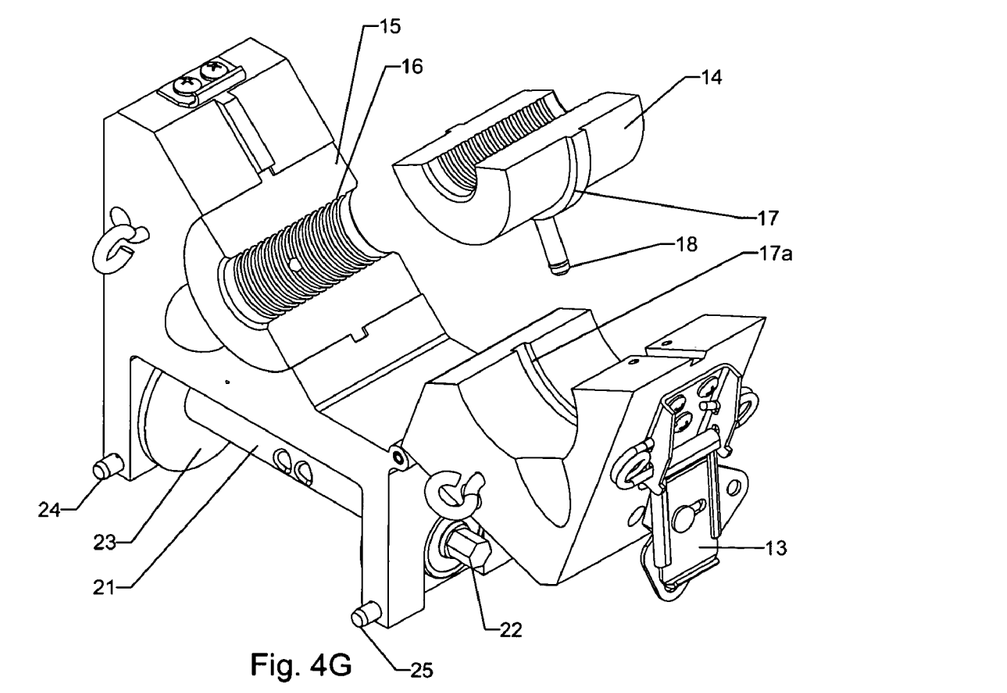
FIG. 4G shows the clamping block of FIG. 4F in an open position.

FIG. 4F illustrates the clamping block 2 of FIG. 1 including the same reference characters but this illustration depicts the clamping block being split on the diagonal instead of being split in half from a square block. This arrangement has a big advantage in that the wind-up spool 21 does not have to be removed from the clamping block every time when the clamping block of FIG. 1 is being opened for inserting a cable therein. FIG. 4G has been opened and it can be seen that the wind-up spool 21 is still in place.

Figure 5:
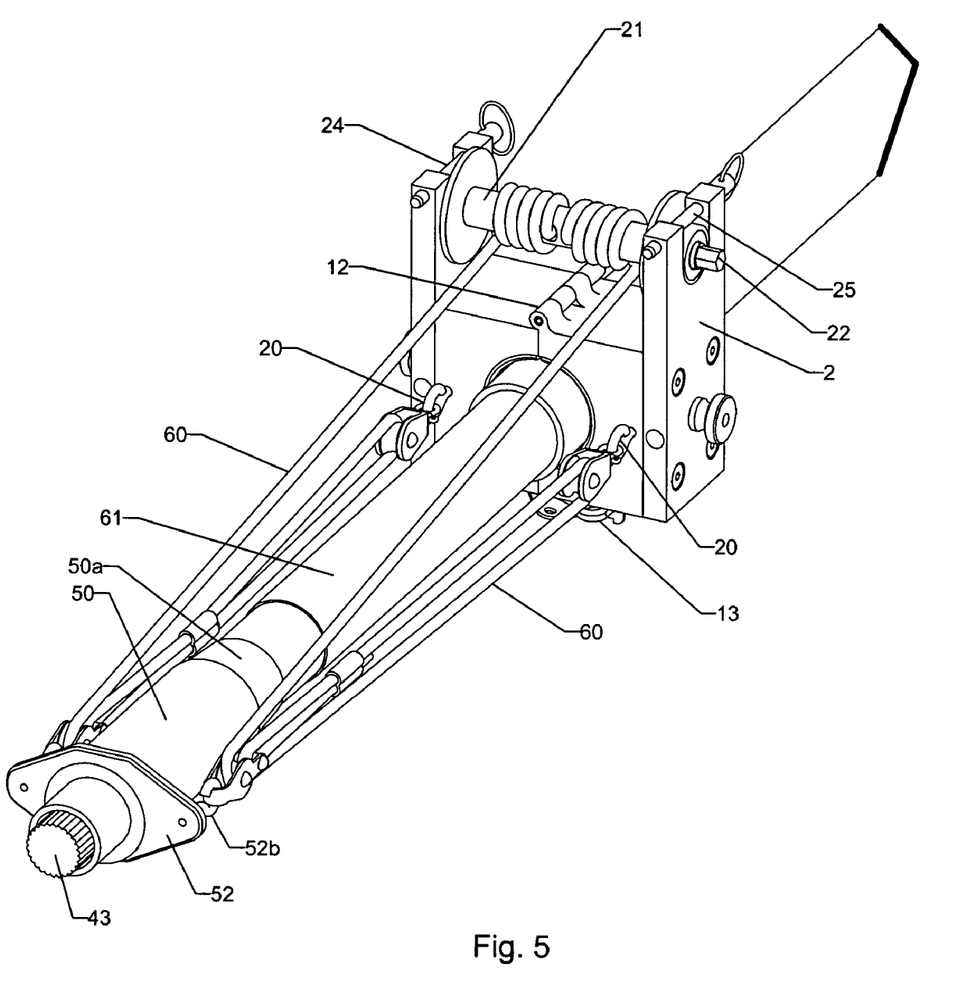
FIG. 5 illustrates a first stage of attaching a permanent adapter to a cable.
Figure 12:
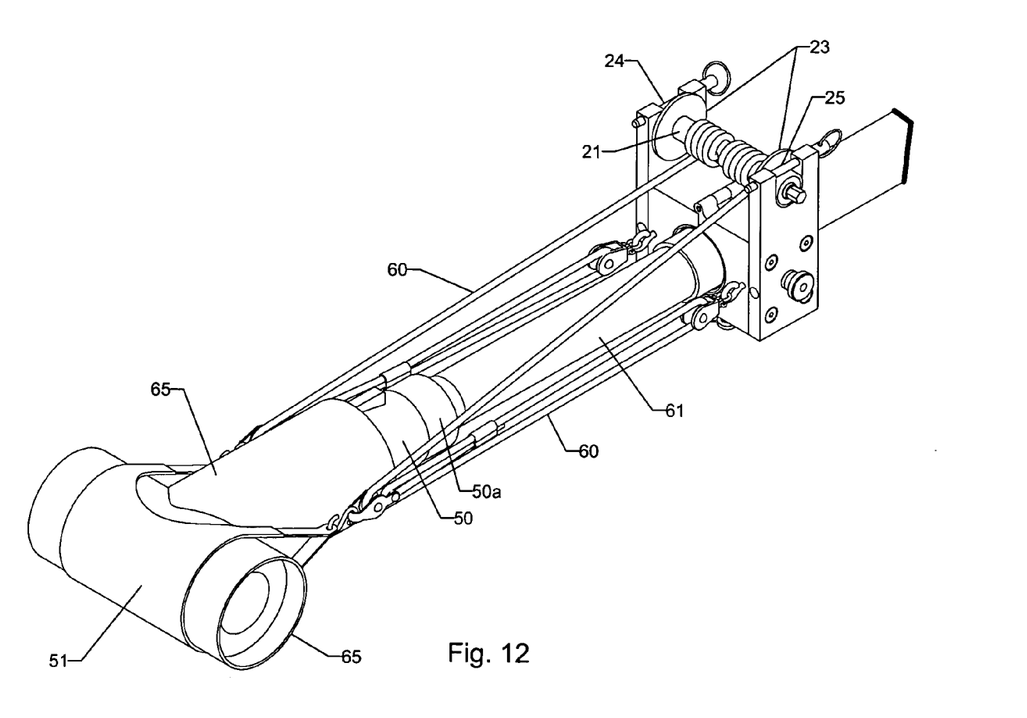
FIG. 12 is a system for making a T-shaped connection.

FIG. 5 illustrates a different embodiment in that it shows the first stage of attaching or installing a T-shaped connector (FIG. 12). This embodiment includes the clamping block 2 including the various elements and reference characters of FIG. 1 but further showing a dual block and tackle mechanism 60. The incoming cable has an outer insulation which is clamped within the clamping block 2 (FIG. 1). The dual block and tackle mechanism is attached at one end on the eyelets 20 on the clamping block and at another end to the wind-up spool 21. There is a permanent adapter 50, having different steps 50a and 50b thereon, being slid over the end of the insulation on the cable 61. This permanent adapter will be supplied in different sizes to accommodate differently sized cables. Each end of the dual block and tackle is attached to an eyelet 20 on the clamping block 2 and the other ends are attached to the wind-up spool 21. The two intermediate sections of the dual block and tackle are each attached to an eyelet (only 52 is shown) which are fastened to a pulling plate 52. It can be seen that when the wind-up spool 21 is activated by rotating the end 22, the dual block and tackle 60 will pull the pulling plate 52 against the adapter and force the same over the existing cable 61.

Figure 5A:
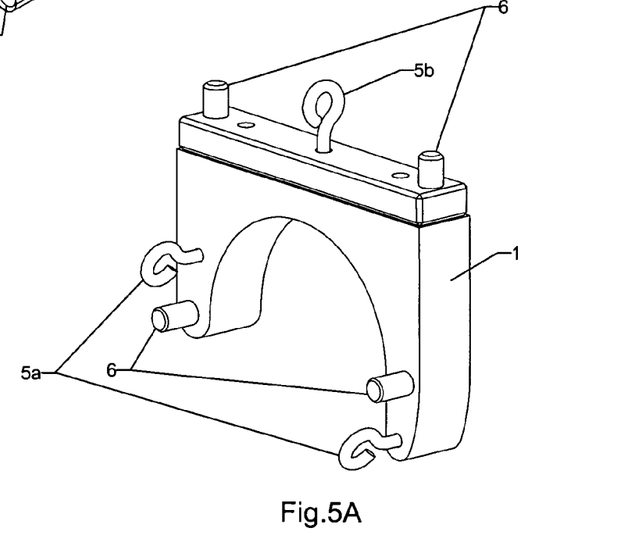
FIG. 5A illustrates a retaining block used in various applications.

FIG. 5A shows the static block 1 of FIG. 3 in more detail. There are two eyelets 5a which will each receive the intermediate ends of the block and tackle 7 (FIG. 1). There are also two pins 5a which receive the ends of the static rods 3 (FIGS. 1-3 and 6) to stabilize the clamping block 2 and the stationary block 1 when the system is in operation.

Figures 6, 7, 8, 9, 10, 11:
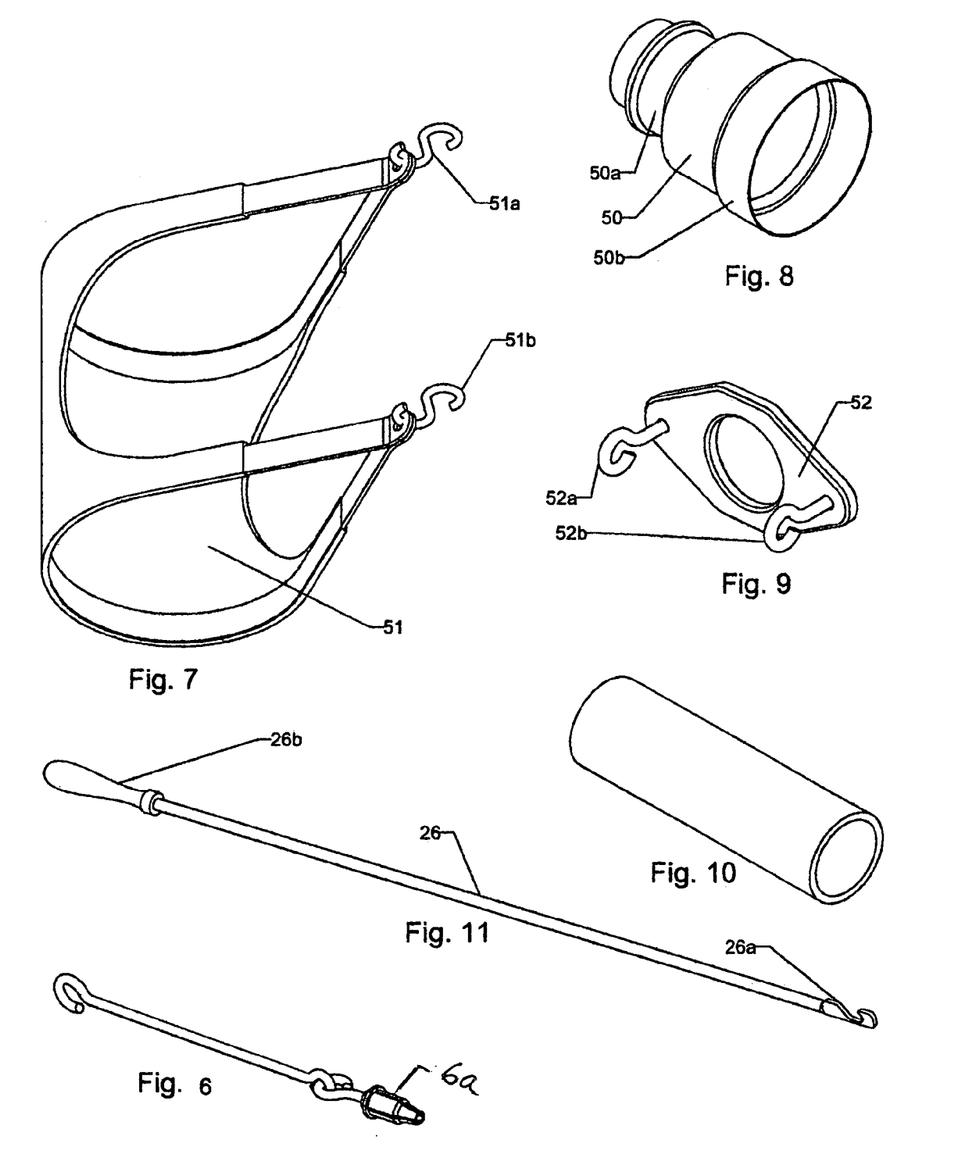
FIG. 6 shows a pull-through rod with an expandable cable connector
FIG. 7 shows a flexible sling used when making a T-connection.
FIG. 8 is a permanent adapter used when making certain connections.
FIG. 9 is a pull-on plate used when making T-connections.
FIG. 10 is a cable protector and an alignment tool.
FIG. 11 shows a pull-through rod for a clamping block.

FIG. 6 illustrates a pull-through rod having an expandable connector 6a at one of its ends. The expandable connector 6a will expand when inserted into the interior of a multiple of wires and when a pulling force is exerted onto the same which is well known in the art.

FIG. 7 illustrates a skirt 51 which will be wrapped around a T-shaped tubing 65 as will be explained below with regard to FIG. 12. The eyelets 51a and 51b will receive the intermediate sections of the block and tackle 60 (FIG. 12).

FIG. 8 shows the permanent adapter 50 of FIG. 5 in more detail in that there are shown the various steps 50a and 50b to be received over the differently sized outer cable circumferences that can be spliced using the inventive system.

FIG. 9 illustrates the pulling plate 52 of FIG. 5 including the eyelets 52a and 52b.

FIG. 10 appears to be a simple length of tubing, however, it is a wire protector and an alignment guide for the adapter shown in FIG. 5.

FIG. 11 illustrates a different pulling tool 26 useful for pulling the block and tackle through the various elements as is shown in FIG. 1. The same reference characters have been used in this FIG. This tool is a simplified version of the pulling tool 26 in FIG. 1. The hook 26a will receive the intermediate section 41 of the block and tackle and the handle 26b will be used to pull the rigid rod 26 through the various elements in a similar manner that the hook 40 (FIG. 1) will pull the block and tackle 41 through the same various elements.

FIG. 12 illustrates the attachment of a T-shaped tubing to an incoming cable. These T-shaped elements are used when heavy duty underground cables are connected within electrical distribution cabinets. To connect the T-shaped tubing to a splice within the T-shaped tubing. the same inventive elements are being used, that is, the block and tackle power system. FIG. 12 shows the same reference characters that were used in previous FIGS. In this illustration, the pulling skirt can clearly be seen at 51 as being wrapped around the T-shaped tubing 65. The intermediate sections 52a and 52b (FIG. 5) of the block and tackle system are received in the eyelets 51a and 51b (FIG. 7). Thus, it can be seen that when the forces of the dual block and tackle system are activated, The T-shaped tubing 65 will be pulled and forced over the adapter 50 until firmly seated against the cable outer periphery.

Figure 13:
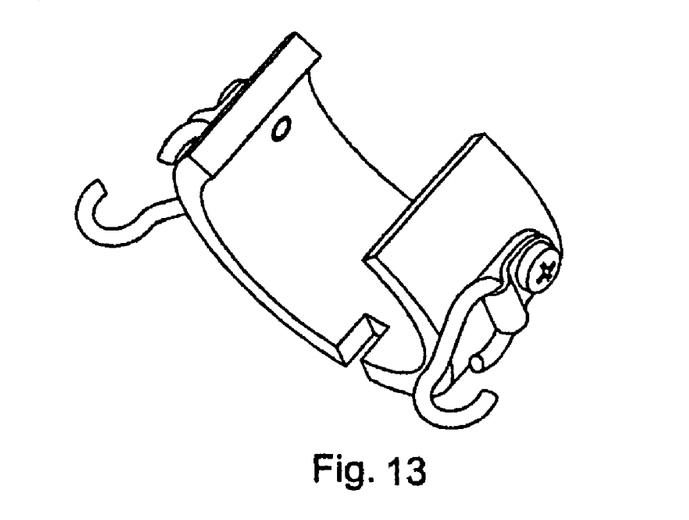
FIG. 13 shows a system for installing a splice housing with a different pull back collar.
Figure 13A:
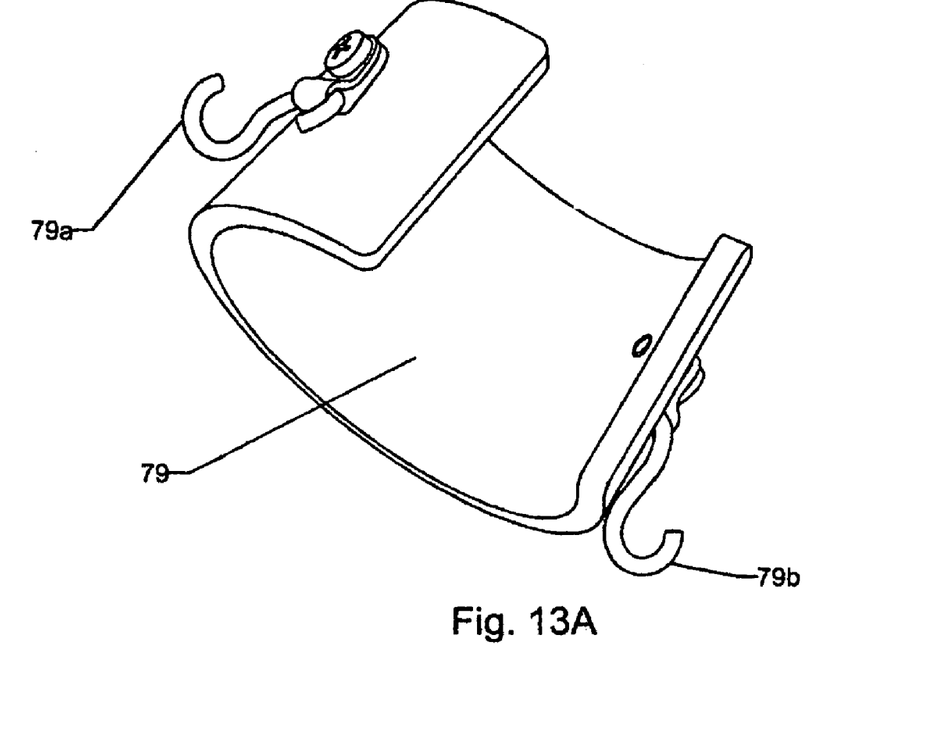
FIG. 13A shows the pull back collar by itself.

FIGS. 13 and 13A are a different embodiment of a pulling element in a simplified version. It consists of a three quarter ring which can be slipped over an adapter 74 in FIG. 15. The dual block and tackle 72 and 73 can be attached to the hooks 79a and 79b.

Figures 14, 14A, 15A, 15B:
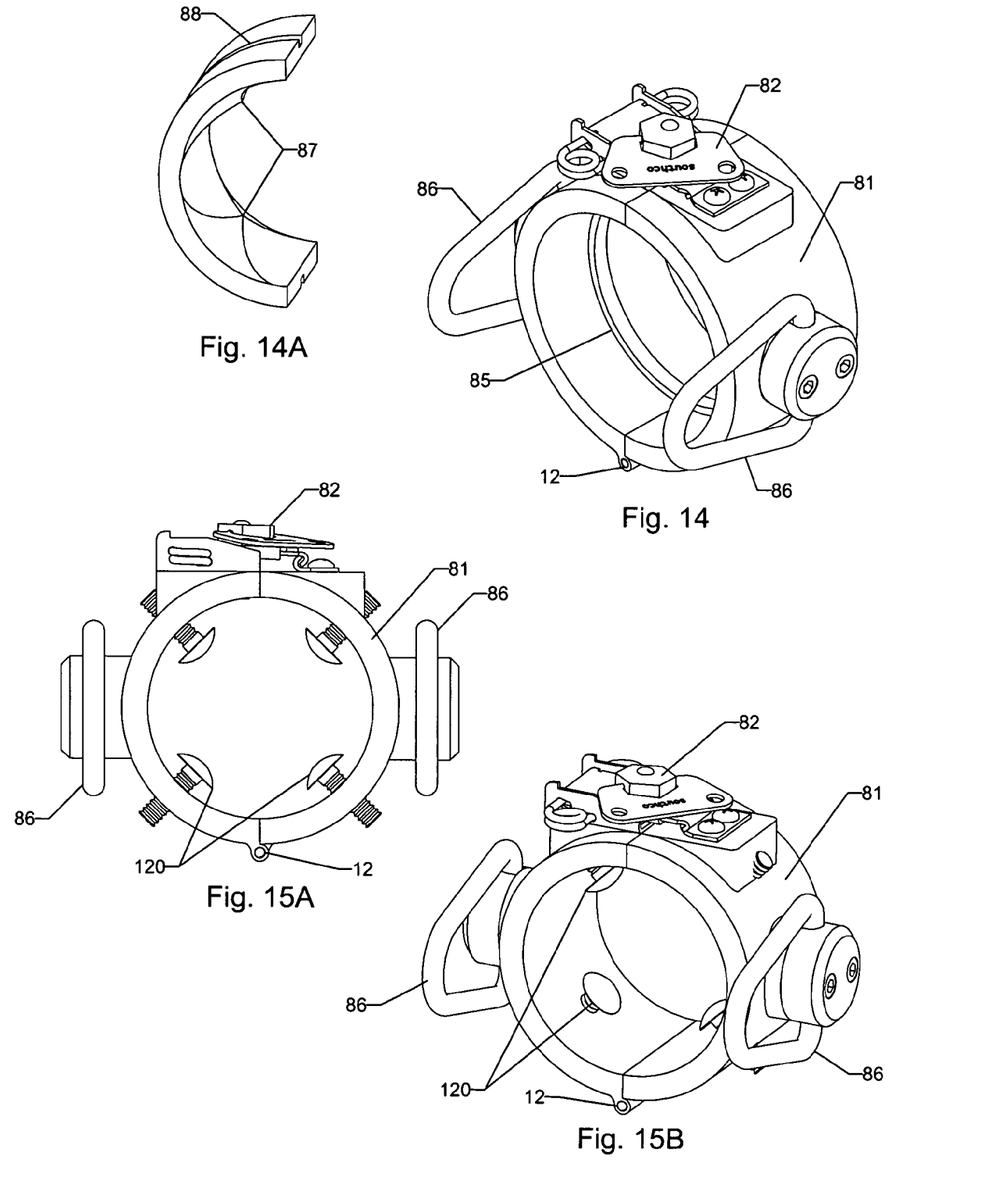
FIG. 14 shows another and different pull-back collar.
FIG. 14A shows a friction insert for the pull-back collar of FIG. 14.
FIG. 15A is a different embodiment of creating friction between a housing and pull-back collar.
FIG. 15B is a perpective view of FIG. 15.
Figures 15, 15C:
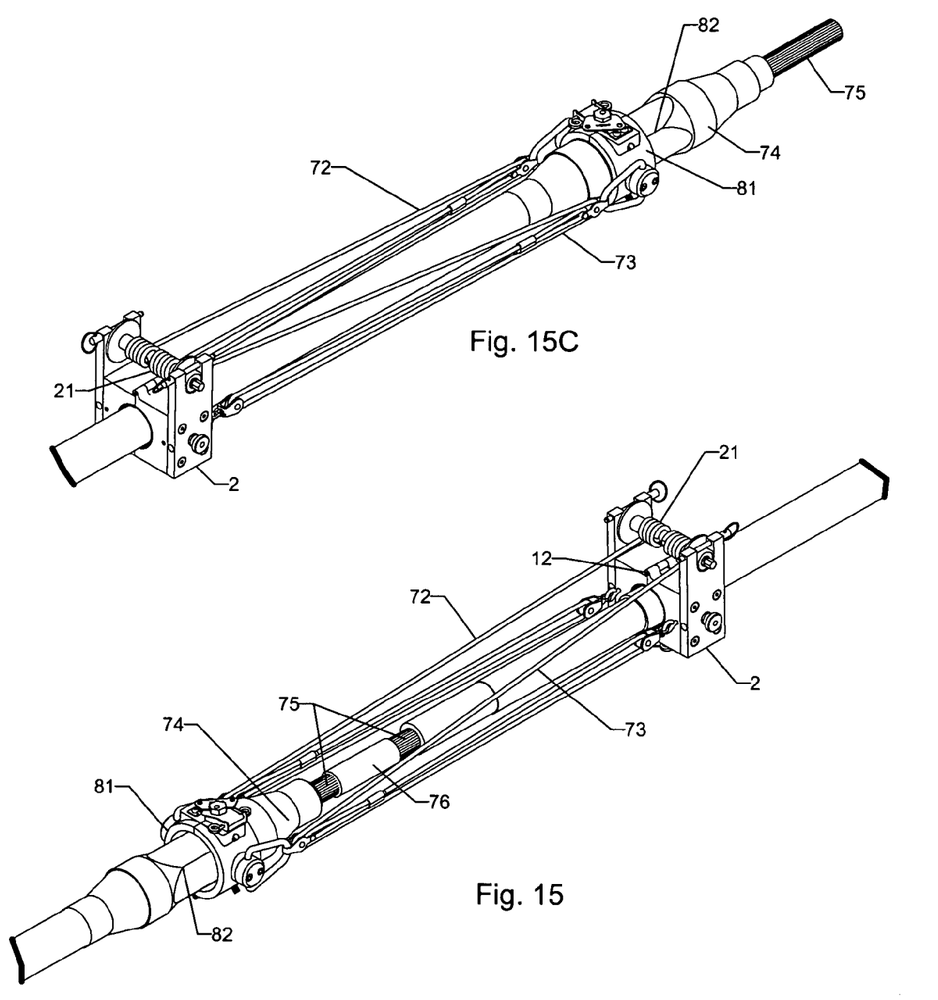
FIG. 15 shows a system for installing a splice housing including the pull-back collar of FIG. 14.
FIG. 15C illustrates a reversal of the elements of FIG. 15.

FIG. 14A illustrates a different embodiment of a pulling housing or block 81 over finished splices 75 in FIGS. 15 and 15A. In this embodiment there is the clamping block with its hinge 12 which is clamped over an adapter 74 which may consist of different sizes depending on the size of the cable being spliced. This embodiment is similar to the one shown in FIG. 3. The static block 1 (FIG. 1) has been modified to appear in a semi-circular configuration 70. This particular embodiment includes the static bars 71 located between the clamping block (illustrated by the presence of the hinge 12 and the static block 70. The pulling force to be applied to moving the housing 74 to be moved over the splicing 75, 76 is received from the force of the block and tackle 72, 73. The block and tackle system is attached to a pull-back collar 79 (FIG. 13). The pull-back collar abuts against a rib on the housing 74. The pull-back collar 79 has attached thereto eyelet hooks 79a and 79b which will receive the intermediate sections of the block and tackle system 72, 73. It can now be seen that, when the block and tackle system is activated, the pull-back collar 79 will be pulled against a rib on the housing 74 and will be forced over the splice 75, 76 and will completely and hermetically seal the spliced cable.

FIG. 14 illustrates a different embodiment of a pulling collar or a clamping block. To this end, the pulling collar 81 consists of two halves which are hingedly connected to each other by way of a hinge 12 (FIGS. 1-3) and connected together by way of a connector 82. The interior of both halves have a centering ridge 85. The interior of the clamping block 81 will receive friction elements 87 which have a friction surface 89 thereon. The outer circumferences of the friction elements 87 have a retention groove 88 therein which is designed to match the centering ridges 85 of the halves of the pulling collar. The pulling collar 81 further has attached thereto pull eyelets 86 for attaching intermediate sections of the block and tackle (FIG. 15).

FIG. 15 shows the pulling collar 81 installed in a system for moving the housing 74 over the splice 75, 76. The pulling collar 81 abuts against a ridge on the housing 81.

FIG. 15A shows yet a different pulling collar 81 which is adapted to accommodate different sizes of cables. To this end, the pulling collar has carriage bolts 120 installed therein by way of threaded connections. The heads of the carriage bolts 120 being placed inwardly of the pulling collar 81. The size of the depressions 82 can change because of a different cable size being operated upon, but the effect of the pulling collar can only be changed by changing the position (inwardly or outwardly) of the carriage bolts 120 that make contact with the depressions 82 (FIG. 15) in the housing 74.

Figures 16, 17:
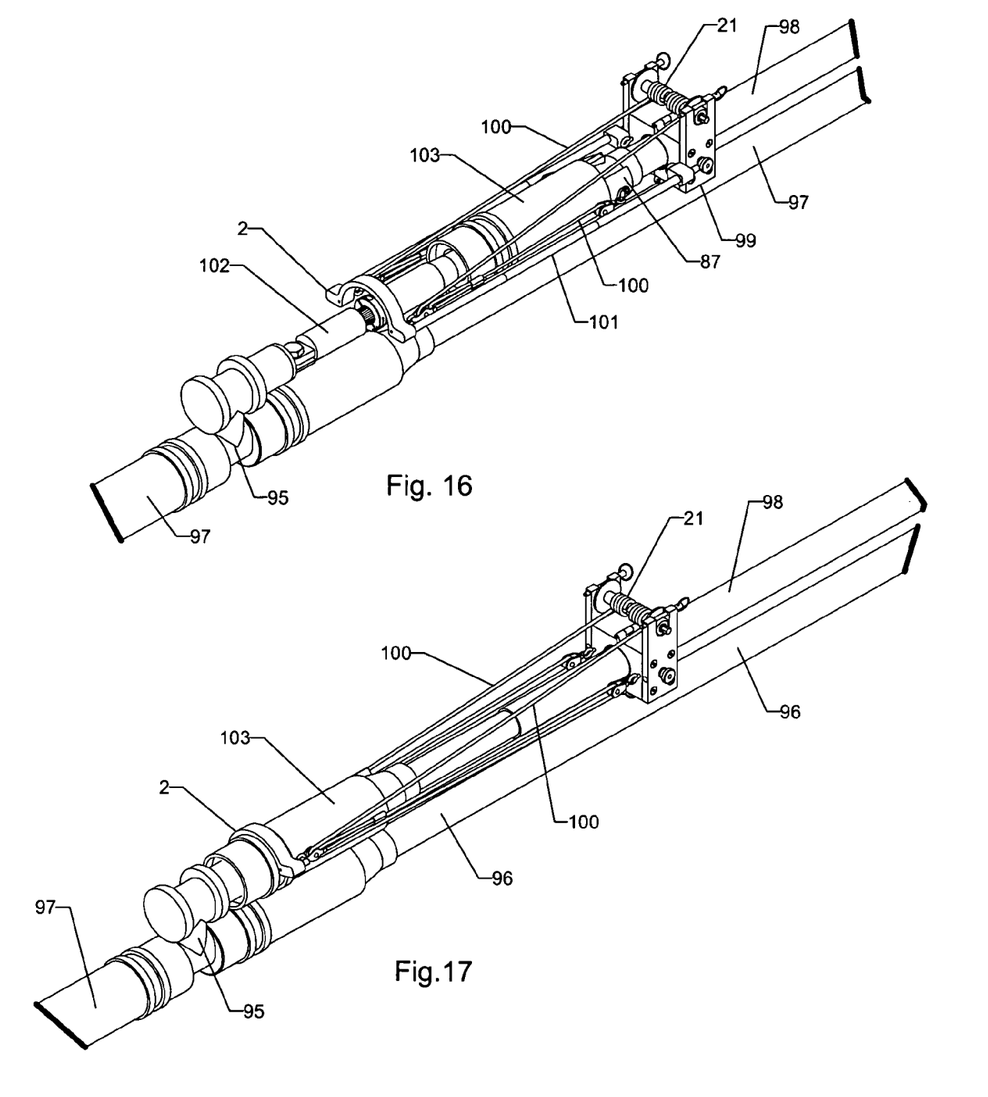
FIG. 16 illustrates a first stage of making a Y-connection.
FIG. 17 shows the second stage of making the Y-connection of FIG. 16

FIG. 16 illustrates a different embodiment of splicing a heavy duty cable in different formations such as Y, T or H-shaped formations. FIG. 16 illustrates a connection involving a Y-shaped formation. In this illustration, there is a first electric branch 96 being connected to a second electric branch 95. A third electric branch 98 is to be spliced into a permanent electric connector 95. The splicing itself will be undertaken again by a block and tackle system which again, as explained above, will involve a stationary static block 1 and a clamping block 99 similar to the clamping block 2 in FIG. 1. The block and tackle block 100 is a dual system that will connect to both sides of the splice housing, similar to splicing systems of FIGS. 12 and 13. FIG. 16 shows the initial set-up prior to activating the block and tackle system and FIG. 17 illustrates the final system wherein the housing 103 has arrived at the final connection position.

Figure 18:
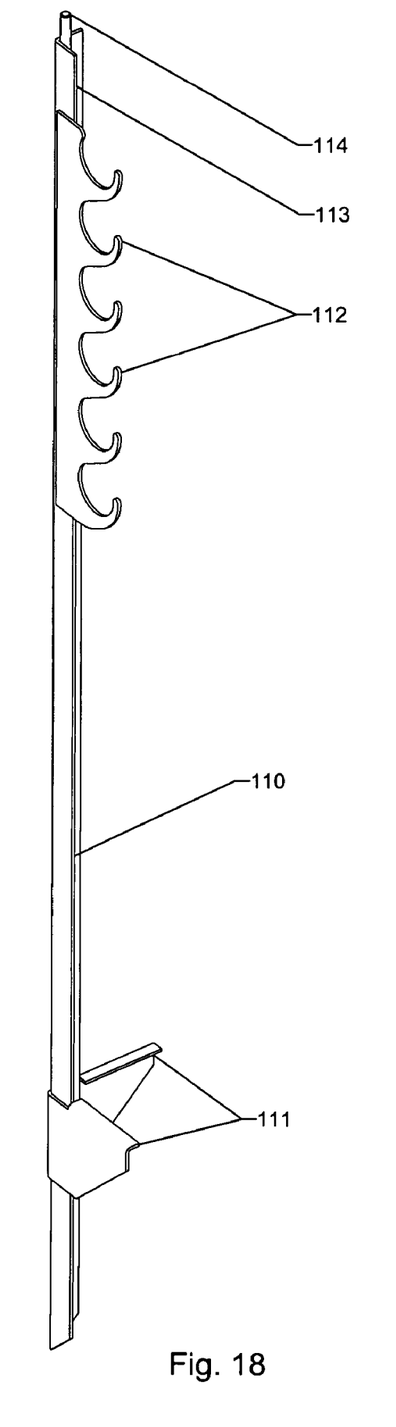
FIG. 18 illustrates a support post to simplify installations.

FIG. 18 illustrates a support device to be used when making the above noted splices in the various embodiments. The support device consists of an upstanding rod or stand 110 which can be driven into the ground wherever underground splices are to be made. This driving into the ground can involve the foot steps 111. The upper section of the rod 110 includes a section 113 having an upper pin 114 that can be connected to the clamping block 2 in FIG. 1 by way of a bore in the bottom of the clamping block 2 and the lowest section 115 can be driven into the ground. The upstanding 110 rod further can include hooks 112 or shelves for receiving items needed in the splicing of the various cables, although very few items or tools are needed when making the above noted splices.

From all of the above, it can be seen that an inventive splicing system has been presented that takes the labor intensive effort out of the manual drudgery of making splices in the splicing of underground cable, no matter what sizes they are.

The invention claimed is:

1. A system of making splices in heavy duty electric cables including a stationary static block and a clamping block separated from each other by way of static bars, a block and tackle mechanism is interposed between said static block and said clamping block to generate a force to move elements located on said electric cables between said static block and said clamping block into predetermined positions.

2. The system of claim 1, wherein one at said static block and said clamping block moves relative to the other.

3. The system of claim 1 including friction elements located within each of said static block and said clamping block to frictionally hold said blocks in place on said cables during an operation of said system.

4. The system of claim 3, wherein one of said friction elements is each located within each of said halves.

5. The system of claim 1 wherein each of said static block and said clamping block are divided into two halves to gain access into said blocks to place said cables therein.

6. The system of claim 5, wherein said two halves are reconnected by a hinge and the two halves are locked together by a clamp on an opposite side of said hinge.

7. The system of claim 1, wherein a wind-up spool for the wind-up of a cord at said block and tackle mechanism is located on said clamping block.

8. The system of claim 7 including a dual block and tackle mechanism being operated by said wind-up spool.

9. The system of claim 8, wherein intermediate sections of said block and tackle mechanism are removably connected to elements located and to be slidably moved on said cables in the operation of making a splice.

10. The system of claim 9, wherein said elements are a housing and a collar to move said housing.

11. The system of claim 10, wherein said intermediate sections of said block and tackle mechanism are connected to said collar.

12. The system of claim 11, wherein said collar has friction elements located therein.

13. The system of claim 12, wherein said friction elements are radially adjustable.

14. The system of claim 13, wherein said friction elements are heads of bolts being screwed into said collar and are protruding inwardly toward and in contact with said housing.

15. The system of claim 14, wherein said housing has grooves therein to receive said heads of said bolts therein.

16. The system of claim 1 including means for making differently shaped connections on said cables, and wherein said differently shaped connections are selected from the group of connections consisting of T-shaped connections and Y-shaped connections.

17. The system of claim 16 including a flexible sling surrounding said T-shape to connect to a pulling force of said block and tackle mechanism.

18. The system of claim 1 including means for supporting said clamping block in a position above ground while making a splice.

19. The system of claim 18, wherein said means for supporting consists of an upstanding rod having a tip thereon, said tip is being received within a bore in an underside of said clamping block.

* * * * *